A. C. SETTLAGE.
DUMPING MECHANISM FOR TRUCKS AND THE LIKE.
APPLICATION FILED SEPT. 13, 1918.
1,328,240. Patented Jan. 13, 1920.
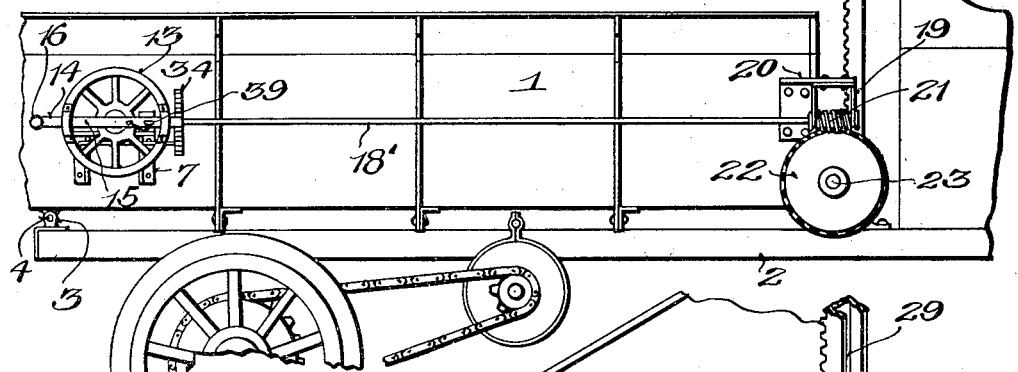
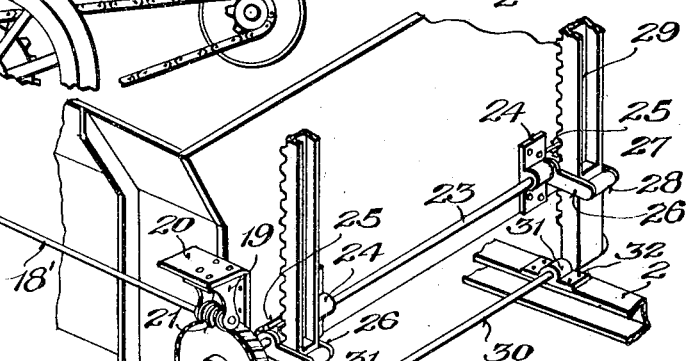
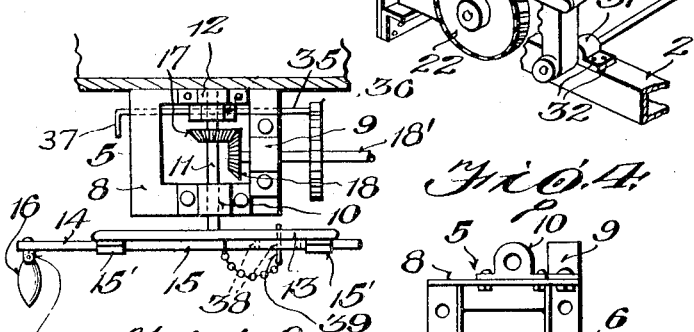
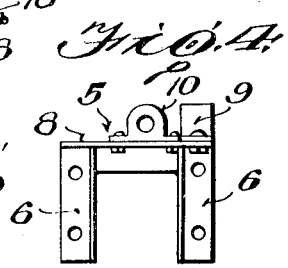
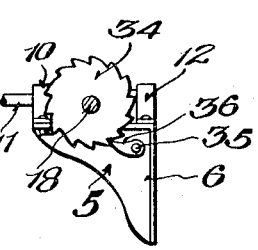
Inventor
August C. Settlage,
By
Attorney

UNITED STATES PATENT OFFICE.

AUGUST C. SETTLAGE, OF NEW BREMEN, OHIO.

DUMPING MECHANISM FOR TRUCKS AND THE LIKE.

1,328,240.   Specification of Letters Patent.   Patented Jan. 13, 1920.

Application filed September 13, 1918. Serial No. 253,941.

*To all whom it may concern:*

Be it known that I, AUGUST C. SETTLAGE, a citizen of the United States, residing at New Bremen, in the county of Auglaize and State of Ohio, have invented certain new and useful Improvements in Dumping Mechanism for Trucks and the like, of which the following is a specification.

This invention relates to improvements in hoisting and dumping mechanism for trucks, wagons, etc.

One object of the invention is to improve structurally upon the mechanism shown and described in my co-pending application Serial Number 74,635, filed June 27, 1916.

A further object of the invention is to simplify mechanisms of this character and to provide a mechanism with which the body of a truck or similar vehicle may be raised and lowered for dumping purposes with great ease and rapidity, and with the expenditure of very little power applied in such a way and at such a point, that the operator can manipulate the parts from a single position on the ground.

A further object of the invention is to improve the details of construction of the handle of the power application elements.

In the drawings—

Figure 1 is a side elevation of so much of an auto truck as is necessary to show the application of my invention.

Fig. 2 is a detail broken perspective view of a portion of the front of the body, showing the position of the pivoted rack bars relative to other parts of the mechanism.

Fig. 3 is a top plan view of the bearing bracket for the power shaft, showing also in plan, the hand wheel, and arrangement of miter gears, for transmitting the lifting power to the mechanism at the front of the body.

Fig. 4 is a side view of the bearing bracket.

Fig. 5 is a side elevation of the ratchet for maintaining the body at its various angles in the dumping operation.

Referring to the drawings, the numeral 1 designates the truck body, which is preferably constructed of steel, and the numeral 2 designates the side bars of the frame of the chassis, which chassis may be of any approved construction.

Mounted upon the rear ends of these bars, are bearings 3 in which is journaled a shaft 4, which is securely attached to the body of the truck, the bearings and shaft serving as a pivotal connection between the truck body and the chassis.

The numeral 5 designates a bracket or gear frame provided with downwardly extending legs 6, apertured for the passage of bolts 7 by which the frame is securely attached to the side of the truck body. This frame comprises in part, horizontal upper portion 8, to which are bolted bearings 9 and 10. The bearing 10 receives short shaft 11, whose inner end is journaled in bearing 12, at the inner part of the frame, and the outer end of this shaft carries hand wheel 13, to which is attached an adjustable handle 14, which handle comprises a bar 15, which passes through apertures in the brackets 15', and a hand grip, or handle proper, 16, to which manual force is applied to rotate the short shaft 11. This shaft 11 further carries a miter gear wheel 17 which is keyed to said shaft and meshes with a similar wheel 18, keyed to the end of the power shaft 18', which extends from the rear of the body to the front, where it is journaled in depending ears 19 in a bracket 20, securely bolted to the front of the body. Interposed between the ears and keyed to the shaft is a worm 21, which meshes with worm wheel 22, keyed to transverse shaft 23, journaled in brackets 24 securely bolted to the front plate of the body. This transverse shaft carries pinions 25 which are keyed thereto between the side pieces 26 of guides 27 the rear ends of which side pieces are apertured for the passage of the shaft 23. The front ends of the side pieces of each guide are connected by antifriction rollers 28. Extending between the pinions, and the rollers, are rack bars 29, whose lower ends are connected by transverse shaft 30 mounted in bearings 31 bolted to the upper faces of the front ends of the side bars of the chassis, as indicated at 32. The upper ends of these rack bars are connected by a cross piece 33.

The numeral 34 designates a ratchet keyed to the shaft 18, and mounted in bearings in the frame 5 is a rod 35 carrying pawl 36, adapted to engage one or the other of the teeth of the ratchet wheel to retain the body in any of its various angular positions in the raising operation. This rod 36 is provided with a handle or lever 37 by which the rod may be manipulated to throw the pawl out of engagement with the ratchet, to permit the body to resume normal or horizontal position.

Reverting to the power application handle, it will be noted that the grip portion of the handle is pivoted, as indicated at 37, to the part 15, so that it may be folded to lie flat against the bar, so as to be out of the way.

In operation, power is applied to the hand wheel, through the operating handle, which in turn rotates the shaft 11, and through the miter gears 17 and 18, rotates the horizontal shaft 18', and through the worm 21, the worm wheel 22 is rotated and thereby the shaft 23, and pinions 25. As the pinions 25 are in mesh with the rack on the rack bars 29, rotation of said pinions will cause them to climb up the rack bars, which during this upward movement rock rearwardly upon their pivots on the frame or chassis, until the body is tilted to the desired angle to discharge the contents of the truck. Meantime, the ratchet and pawl mechanism has maintained, the body and the weight of the contents therein, at the various angles in its upward movement. When the contents of the truck are discharged, the ratchet rod is manipulated to throw the pawl out of the ratchet to permit the body to resume normal position.

The bar 15 of the operating handle is provided with a series of apertures 38 for the reception of a cotter pin 39, adapted to pass through any one of said apertures into a corresponding aperture in one of the spokes of the wheel, so that the bar may be adjusted to bring the handle 16 near to or farther from the center of rotation, to increase or diminish the leverage as may be desired.

Having thus described my invention, what I claim is:

1. In a dumping mechanism for trucks, the combination with the main frame, of a body pivoted thereto at the rear end, a power shaft journaled in suitable bearings and carried by the body and extending from near the rear to the front, and provided at its forward end with a worm and at its rear end with a gear wheel, a gear wheel mounted in a suitable frame carried by the body at the rear thereof and in mesh with the gear wheel on the power shaft, whereby the power shaft is rotated, a worm wheel mounted on the forward part of the body and in mesh with the worm, a rack pivoted to the main frame in front of the body, a transverse shaft carried by the body and having pinions thereon in mesh with the rack on the frame, whereby when power is applied to the power shaft, the pinions will be caused to travel on the rack to raise the body.

2. In a dumping mechanism for trucks and the like, the combination with the main frame, of a body pivoted thereto, at the rear end thereof, a power shaft journaled in suitable bearings on the body, and having at its rear end a miter gear wheel and at its forward end a worm, a frame carried by the rear of the body, a shaft journaled in the frame and carrying a miter gear in mesh with the miter gear on the power shaft, and means for applying power to the last mentioned gear, whereby the power shaft is rotated, a rack bar pivoted to the front part of the main frame in advance of the front end of the body, a transverse shaft carried by the body and having a pinion thereon, and also a worm gear in mesh with the worm on the power shaft, the pinion on the transverse shaft engaging the rack, whereby when the transverse shaft is rotated, the pinions will be caused to climb the rack to elevate the body.

3. In a dumping mechanism for trucks and the like, the combination with a main frame, of a body pivoted to said frame at the rear end of said body, a power shaft journaled in suitable bearings on the side of the body and having a miter gear at its rear end and a worm at the front end, a frame mounted on the body, a shaft journaled in the frame, and carrying a miter gear in mesh with the miter gear on the power shaft, a suitable handle on the second shaft, whereby power is applied to the power shaft, manually, a transverse shaft journaled in suitable bearings on the front of the body and having two pinions thereon and a worm wheel in mesh with the worm on the power shaft, two vertically positioned rack bars pivoted to the main frame in front of the body, the rack bars and pinions being in mesh whereby when the transverse shaft is rotated, the pinions will be caused to climb the rack bars and means for guiding the rack bars and holding the same in mesh with the pinions in all angular movements of the body and rack bars.

In testimony whereof I affix my signature in presence of two witnesses.

AUGUST C. SETTLAGE.

Witnesses:
LULA M. SCHOWE,
WILBUR S. HUNTER.